United States Patent
Chung

(10) Patent No.: US 11,976,731 B2
(45) Date of Patent: May 7, 2024

(54) PENETRATION SEALING SYSTEM

(71) Applicant: Timothy Chung, Walnut, CA (US)

(72) Inventor: Timothy Chung, Walnut, CA (US)

(*) Notice: Subject to any disclaimer, the term of this patent is extended or adjusted under 35 U.S.C. 154(b) by 265 days.

(21) Appl. No.: 17/244,148

(22) Filed: Apr. 29, 2021

(65) Prior Publication Data

US 2021/0341060 A1 Nov. 4, 2021

Related U.S. Application Data

(60) Provisional application No. 63/017,492, filed on Apr. 29, 2020.

(51) Int. Cl.
*F16J 15/34* (2006.01)
*F04B 53/16* (2006.01)

(52) U.S. Cl.
CPC ........... *F16J 15/3448* (2013.01); *F04B 53/16* (2013.01)

(58) Field of Classification Search
CPC .. F16J 15/3228; F16J 15/3224; F16J 15/3216; F16J 15/3204; F16J 15/32; F04B 53/16; F04B 1/0448; F04B 1/122; F04B 27/0821; F04B 27/0873; F04B 27/1036; F04B 39/041

See application file for complete search history.

(56) References Cited

U.S. PATENT DOCUMENTS

| 4,042,248 A * | 8/1977 | Williamitis ........... F16J 15/3228 384/387 |
| 4,539,895 A * | 9/1985 | Tanaka ................. F16J 15/3204 92/249 |
| 2004/0160014 A1* | 8/2004 | Uhrner ................. F16J 15/3228 277/549 |

FOREIGN PATENT DOCUMENTS

DE 102018101656 A1 * 7/2019
EP 0123724 A2 * 11/1984

* cited by examiner

*Primary Examiner* — Philip E Stimpert
(74) *Attorney, Agent, or Firm* — Morrison & Foerster LLP

(57) ABSTRACT

A sealing system includes a housing with an interior chamber, where the interior chamber includes a mouth. The sealing system also includes a seal positioned adjacent to the mouth of the interior chamber and a plunger configured to move through the seal and into the interior chamber along a longitudinal axis of the sealing system. The plunger is configured to deform the seal from a first position to a second position, where in the first position, the seal has a first shape, and in the second position, the seal has a second shape, different from the first shape.

15 Claims, 10 Drawing Sheets

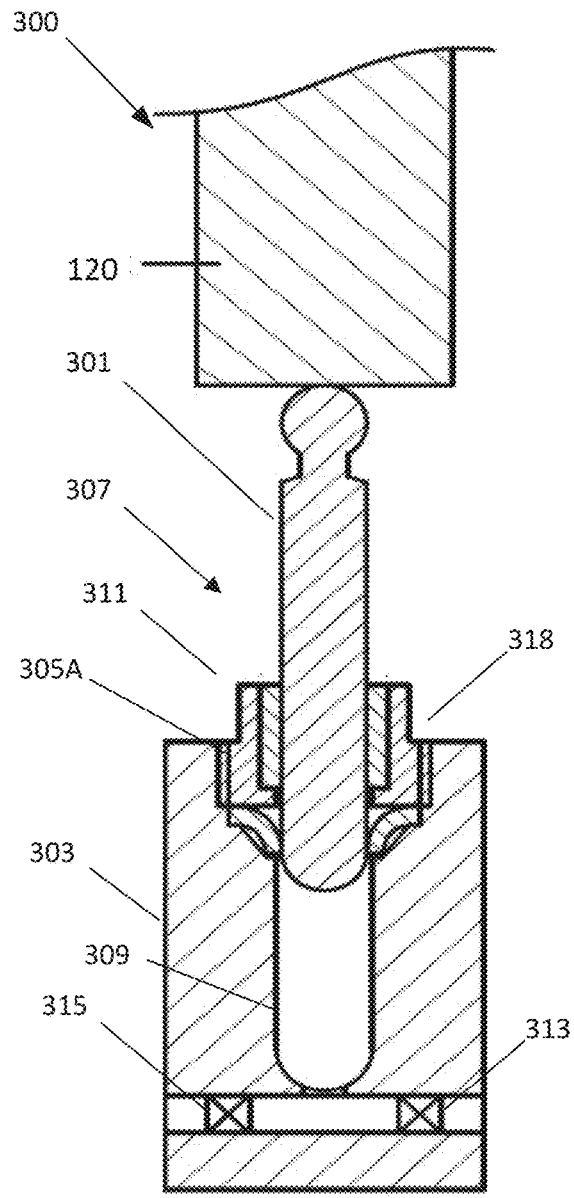
FIG. 3F
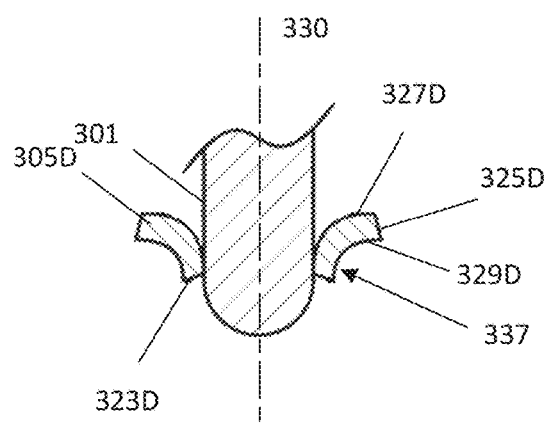
FIG. 3D
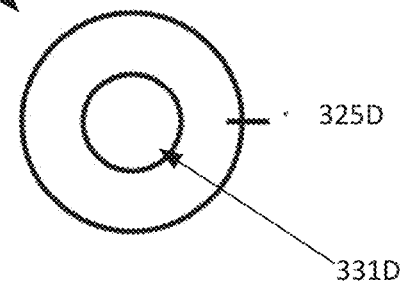
FIG. 3E
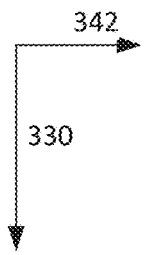

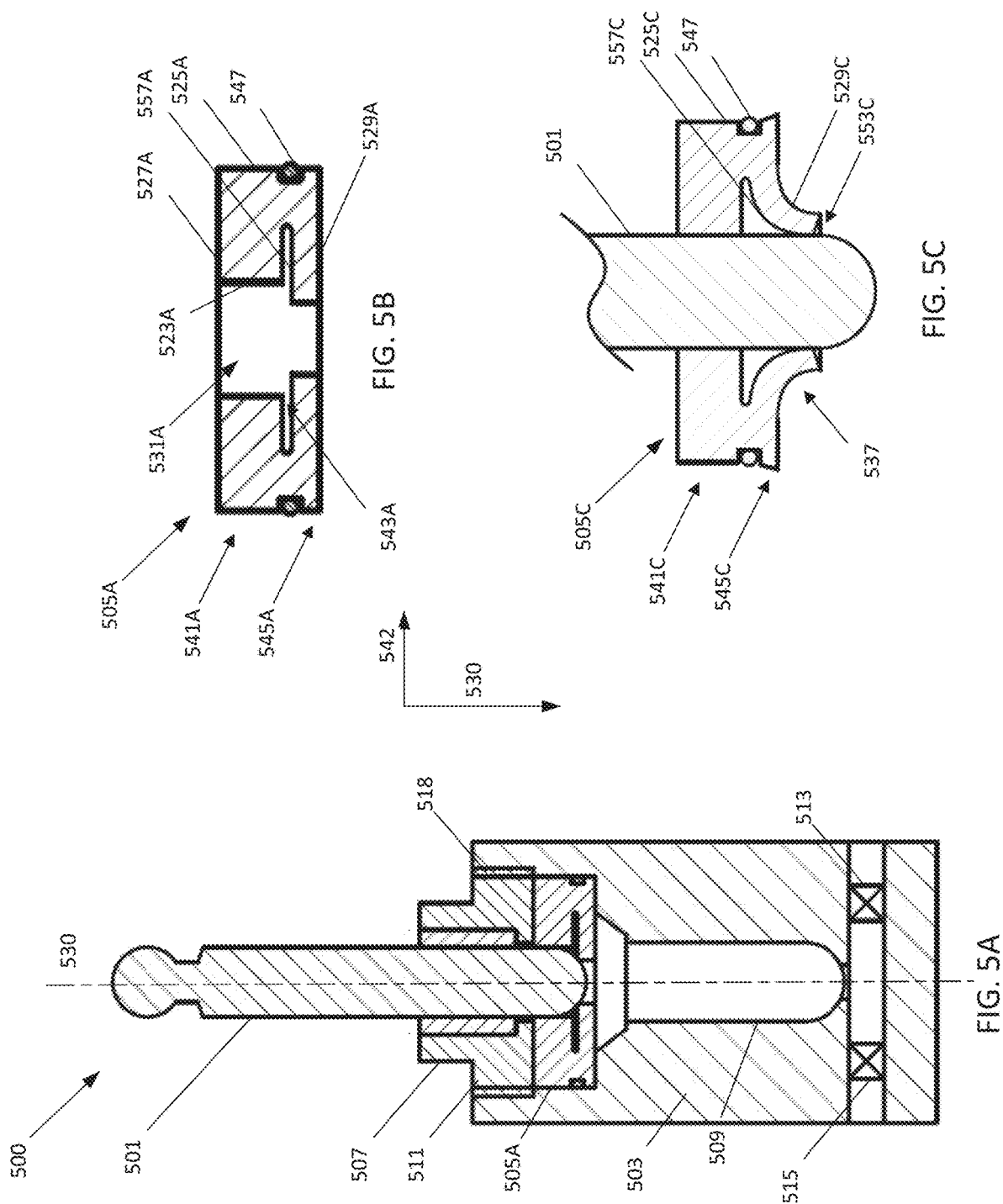

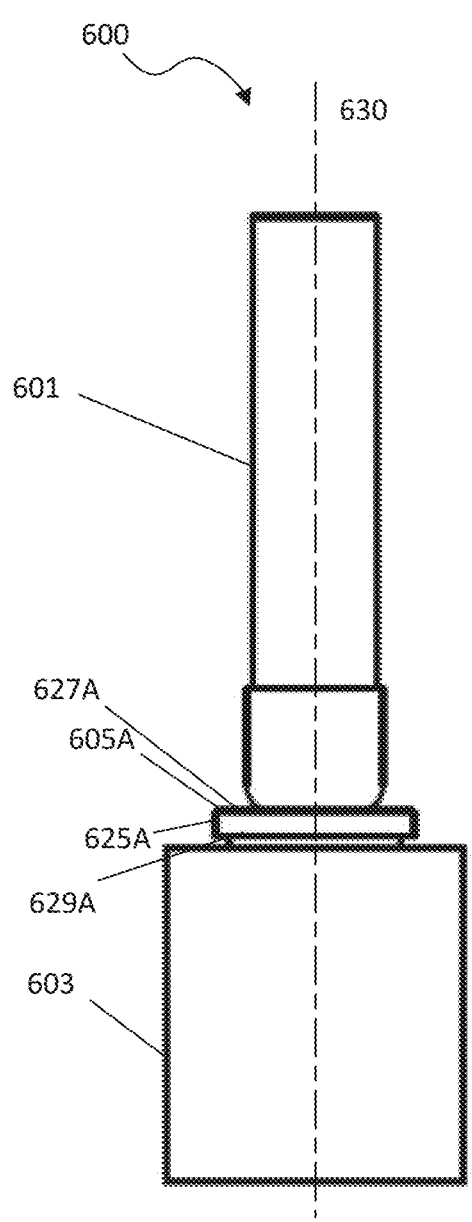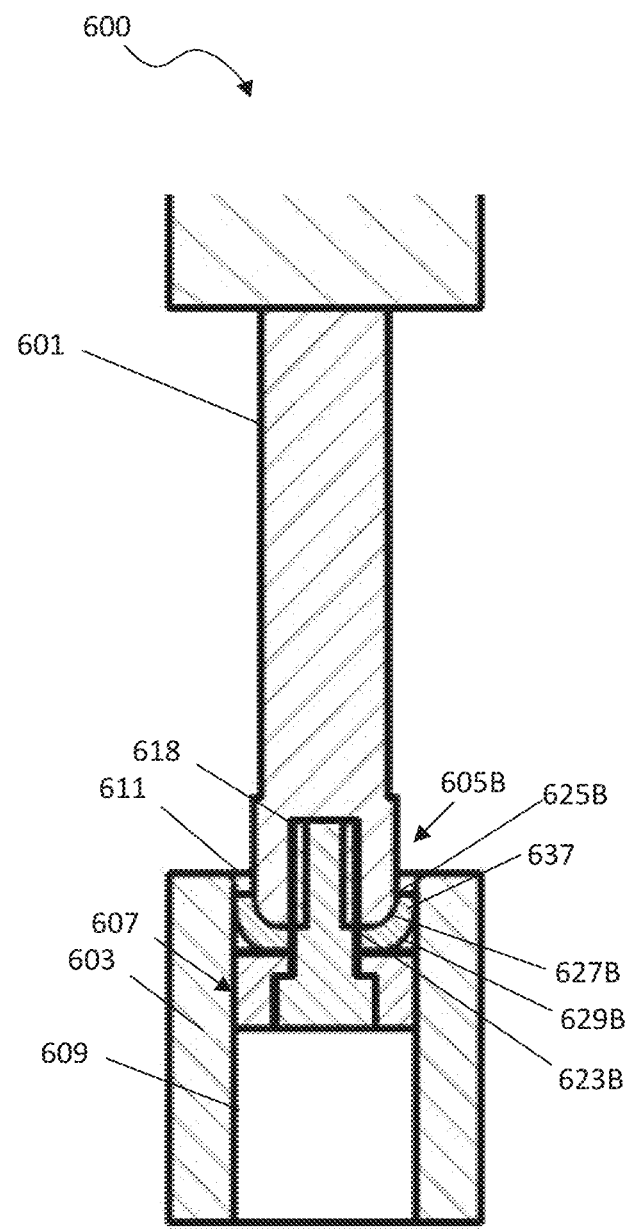
FIG. 6A
FIG. 6B

PENETRATION SEALING SYSTEM

CROSS-REFERENCE TO RELATED APPLICATION

This application claims the benefit of U.S. Provisional Application No. 63/017,492, filed on Apr. 29, 2020, the entire disclosure of which is incorporated herein by reference for all purposes.

FIELD OF DISCLOSURE

This disclosure relates generally to a sealing system and a method of creating a seal, particularly, in reciprocating-type positive displacement pumps, such as piston pumps or plunger pumps. More specifically, this disclosure relates to an improved sealing system capable of withstanding high pressure and prolonged use of the reciprocating-type positive displacement pumps with minimal wear.

BACKGROUND OF THE DISCLOSURE

Positive displacement pumps may be used in many applications, such as paint sprayers, pressure washers, etc. Positive displacement pumps may cause fluid to move by trapping the fluid in a volume and forcing (i.e., displacing) the trapped volume into a discharge pipe. One type of positive displacement pumps may be reciprocating-type positive displacement pumps such as piston pumps and plunger pumps.

A piston pump may include a piston, a sealing system (e.g., rings, packing, etc.), an interior chamber, and a discharge pipe. The sealing system may be attached to the piston and may move with it during a stroke. One stroke (e.g., a return stroke) may force the fluid from a fluid source to enter into the interior chamber, and another stroke (e.g., a forward stroke) may force the trapped fluid from the interior chamber into a receiving component. The piston pump may be a single acting pump that forces fluid only on its forward stroke, or may be a double acting pump that forces fluid on both the forward stroke and the return stroke. In some instances, piston pumps can be used in low flow and/or moderate pressure (e.g., up to 2000 PSI) applications.

A plunger pump may include a plunger, a sealing system, a volume, and a discharge pipe. The plunger pump may be similar to a piston pump, but its sealing system may not be attached to a plunger. The sealing system may be stationary, and the plunger may move through the interior of the sealing system during a stroke. Similar to a piston pump, one stroke (e.g., a return stroke) may force fluid(s) to enter into the volume, and another stroke (e.g., a forward stroke) may force the trapped volume into the discharge pipe. The plunger pump may be a single acting pump that forces fluid only on its forward stroke, or may be a double acting pump that forces fluid on both the forward stroke and the return stroke. In some instances, plunger pumps may be used in high pressure (e.g., up to 3000 PSI) applications.

Each positive displacement pump may include a sealing system. The sealing system may be configured to prevent leakage of fluid. For example, in unwanted instances, fluid may leak past the sealing system near the shaft of the piston or plunger. In some implementations, the sealing system may prevent the mixing of separated fluids (e.g., liquids, gases, etc.). In implementations where the pump is included in machinery having lubricant or other hydraulic material located throughout, the sealing system may be configured to prevent the lubricant (or other hydraulic material) from leaking into unwanted areas of a machine.

As discussed above, in the piston pump, the sealing system (along with a piston) may be repeatedly moving with each stroke. In the plunger pump, the plunger may move with respect to the sealing system. In both types of reciprocating-type positive displacement pumps, the surfaces of the piston/plunger and the sealing system may make contact at a sealing surface, and this repeated movement may cause friction at the sealing surface. This friction may eventually degrade the sealing system and diminish its sealing properties, such that fluid is permitted to leak past the sealing system.

The sealing system may be particularly prone to wear in certain applications, such as with hydraulic paint sprayers. With a hydraulic paint sprayer, a plunger pump may be used to pump relatively abrasive fluids under high pressure to a spray gun, which hydraulically atomizes and sprays the paint on a surface. The sealing system in the plunger pump may including a plurality of packings (e.g., annular elements with a v-shaped profile) alternately stacked between a plurality of spacer elements. The plurality of packings can be compressed together longitudinally, e.g., by manually tightening a gland nut. The compression of the plurality of packings may cause the inner diameter of the packings to expand and compress against the shaft of the plunger, thereby creating a seal. The stack of multiple layers of packings and multiple layers of spacers may create a long footprint along the shaft. Some of the packings may be redundant and may provide security against failure of one or more packings.

There are several disadvantages to using packings in a pump. Packings may have low upfront cost, may be easy to install, and its materials may be readily available, but may be prone to leakage depending on the compression of the packings. Over tightening of the packings can result in excessive wear of the shaft and may cause a need for excessive power to move the shaft during a stroke. Insufficient tightening may result in leakage past the sealing system and destruction of it, particularly for pumps that use abrasive fluids (e.g., ones used in hydraulic paint sprayers). Moreover, due to its annular shape, the packings are only suitable to provide a seal to cylindrical plunger shafts that do not have a pronounced wear pattern.

The leakage caused by an over or under-compressed packing may be addressed if the pump is easily accessible when installed in a machine. For example, a technician may adjust the gland nut to adjust the compression of the packings. However, in some machines such as a hydraulic paint sprayer, the pump may be internally located inside the machine and may be hard to access. In such machines, adjusting the gland nut may not be feasible and may require completely dismantling the machine. If a leak is not diagnosed once it occurs in a pump, particles of the fluid may wear the first of the series of packings and spacers. Due to the high fluid pressure, subsequent packings and spacers may be damaged, resulting in destruction of the seal. As a result, leaks may not be diagnosed in internally located pumps until the pump (e.g., the sealing system and/or plunger) is completely damaged. Another problem associated with over-compression is that once there is wear on a plunger shaft, e.g., caused by the first sealing system comprising over-compressed packings, a second sealing system may not be able to accommodate the irregular wear pattern of the plunger shaft.

Therefore, an improved sealing system for use in reciprocating-type positive displacement pumps, such as piston pumps or plunger pumps, may be desired. The desired sealing system may be one where the sealing properties do not diminish due to wear at the sealing surface. The desired sealing system may be one where the seal can conform to the unique wear patterns of a plunger in a pump.

BRIEF SUMMARY OF THE DISCLOSURE

Disclosed herein is an improved sealing system for use in reciprocating-type positive displacement pumps, such as piston pumps and plunger pumps. The sealing system may provide a seal comprising a unitary body that is resilient and durable for use with a positive displacement pump. The seal may be formed by penetrating and deforming the seal with the reciprocating-type positive displacement pump. In this manner, the seal may conform to the specific geometry of the pump, e.g., the plunger or casing of a pump.

Other seals that are prefabricated and used in a positive displacement pump may not be configured to conform to a particular plunger or casing of a pump. For example, if a plunger is worn and does not have a consistent outer diameter, a pre-fabricated seal may not adequately seal the worn plunger shaft. Thus, embodiments of this disclosure may provide a resilient and durable seal that may be used with a variety pump assemblies. Additionally, the disclosed sealing system may be used to easily and quickly produce a seal body for use with a variety pump assemblies, particularly in hydraulic paint sprayers. In some examples, the seal may be a single piece.

BRIEF DESCRIPTION OF THE DRAWINGS

FIGS. 3A-3F illustrate a seal, according to some embodiments of the disclosure.

FIGS. 5A-5C illustrate a seal, according to some embodiments of the disclosure.

FIGS. 6A-6D illustrate a sealing system, according to some embodiments of the disclosure.

DETAILED DESCRIPTION

Figure 1:
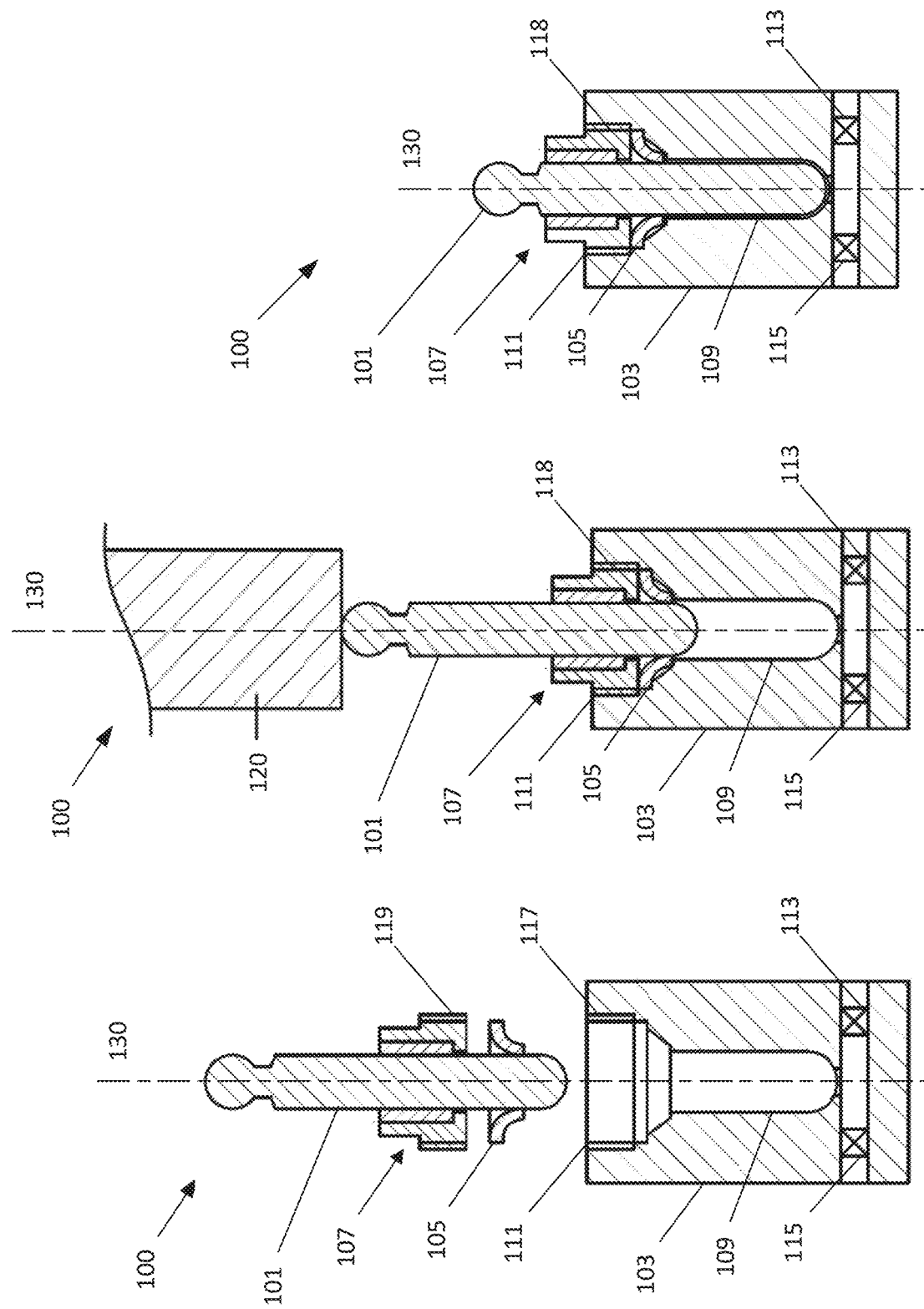
FIGS. 1A-1C illustrate cross-sectional views of a sealing system, according to some embodiments of the disclosure.

The present disclosure may provide a method to manufacture and use a seal in a pump with a reciprocating plunger. Embodiments of the disclosure may provide a seal comprising a unitary body that is resilient and durable for use with a positive displacement pump. The pump may be a single displacement pump. In some examples, the pump may be a double displacement pump. Embodiments of the disclosure may provide a seal that can conform to the specific geometry of the pump, e.g., the plunger or casing of a pump. Thus, following installation of the seal, maintenance and/or adjustment of the seal may not be required. Other seals that are prefabricated and used in a plunger may not be configured to conform to a particular plunger or casing of a pump. For example, if a plunger is worn and does not have a consistent outer diameter, a pre-fabricated seal may not adequately seal the worn plunger shaft. For example, packing-type seals may have to be overtightened to form a seal, which may lead to further wear of the plunger shaft. Thus, embodiments of the disclosure may provide a resilient and durable seal that may be used with a variety pump assemblies. Embodiments of the disclosure may be used to easily and quickly produce a seal body for use with a variety pump assemblies, particularly in hydraulic paint sprayers.

The following description is presented to enable a person of ordinary skill in the art to make and use various embodiments. Descriptions of specific devices, techniques, and applications are provided only as examples. These examples are being provided solely to add context and aid in the understanding of the described examples. It will thus be apparent to a person of ordinary skill in the art that the described examples may be practiced without some or all of the specific details. Other applications are possible, such that the following examples should not be taken as limiting. Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to a person of ordinary skill in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combination of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

FIGS. 1A-1C illustrate an example plunger pump 100, according to some embodiments of the disclosure. FIG. 1A illustrates a cross-sectional view of the individual components of the example plunger pump 100. The plunger pump 100 may include a casing 103, a plunger 101, a seal 105, and a cap 107. In some embodiments, FIG. 1A may illustrate the individual components of the plunger pump 100 after being assembled.

The casing 103 may be configured to house the components of the pump 100. The casing 103 may include an interior chamber 109 with a mouth 111 located at a top (e.g., proximate) end of the interior chamber 109. The interior chamber 109 may be configured to receive a shaft of the plunger 101. In some embodiments, the properties (e.g., size, shape, etc.) of the interior chamber 109 may resemble the properties of the plunger 101. In some embodiments, vertical walls of the interior chamber 109 may be parallel.

The mouth 111 of the casing 103 may provide an opening for the plunger 101 to move longitudinally in and out of the interior chamber 109 of the casing 103. In some embodiments, the diameter of the mouth 111 may be greater than the diameter of the shaft of the plunger 101. In some embodiments, the diameter of the mouth 111 may be greater than or equal to the diameter of the seal 105, the cap 107, or both. In some embodiments, the mouth 111 may include threads 117 to provide a threaded connection 118 to the cap 107, which may include corresponding threads 119.

An inlet valve 113 and an outlet valve 115 may be located near a bottom (e.g., distal) end of the interior chamber 109. In some embodiments, the inlet valve 113, the outlet valve 115, or both may be located at an opposite end of the interior chamber 109 than the plunger 101. The inlet valve 113 may receive fluid(s) from, e.g., a fluid source (not shown) and may be configured to control a path for the fluid(s) to enter the interior chamber 109. The outlet valve 115 may force fluid(s) into, e.g., a receiving component and may be configured to control a path for the fluid(s) that exit the interior chamber 109. Exemplary receiving components can include, but are not limited to, a hydraulic atomizer and a sprayer (not shown).

The plunger 101 may be configured to force the fluid(s) in the interior chamber 109 into the receiving component. Additionally or alternatively, the plunger 101 may be configured to force the fluid(s) from the fluid source into the interior chamber 109. In some embodiments, the plunger 101 may create this force by moving along longitudinal axis 130 in and out of the casing 103. In some embodiments, a diameter of the plunger 101 may be the same as the diameter of the interior chamber 109.

The sealing system of the plunger pump 100 may include the seal 105. The seal 105 may be positioned around an outer perimeter of the plunger 101. In some embodiments, the seal 105 may be configured to be located in the casing 103 when the plunger 101 is in the casing 103 and moves longitudinally along the longitudinal axis 130. Additionally or alternatively, the seal 105 may be positioned in the mouth 111 of the casing 103. In some embodiments, the seal 105 may be capable of moving longitudinally along the shaft plunger 101 during a stroke. In some embodiments, the seal 105 may not move relative to the casing 103 during a stroke. The properties of seal 105 are discussed in more detail below.

The cap 107 may be configured to hold the seal 105 in place when the cap 107 is fastened to the casing 103. The cap 105 may be positioned around an outer perimeter of the plunger 101. As discussed above, the cap 107 may be threadably coupled to the mouth 111 of the casing 103. In some embodiments, the cap 107 may be capable of moving longitudinally along the shaft of the plunger 101 during a stroke. In some embodiments, the cap 107 may not move relative to the casing 103 during a stroke. The cap 107 may include one or more nuts, for example. In some embodiments, the cap 107 may include a threaded connection such that it can be fastened to the mouth 111 of the casing 103. In some embodiments, the threaded connection may include a plurality of turns such that the longitudinal position of the cap 107 can be adjusted relative to the mouth 111.

FIGS. 1B-1C illustrate cross-sectional views of the plunger pump 100 during operation. FIG. 1B shows the plunger pump 100 with the plunger positioned at the top of the interior chamber 109, e.g., at the top of a forward stroke. FIG. 1C shows the plunger pump 100 with the plunger positioned at the bottom of the interior chamber 109, e.g., at the bottom of the forward stroke. In some examples, the plunger 101 may be coupled to a connecting rod 120, as shown in FIG. 1B. The connecting rod 120 may be configured to control the longitudinal movement of the plunger 101 along the longitudinal axis 130 during operation of the pump. In some embodiments, a hydraulic motor, a pneumatic motor, and/or an electric motor may control the movement of the connecting rod 120 and the plunger 101 in the pump. During operation of the plunger pump 100, movement of the plunger 101 in and out of the interior chamber 109, along with the opening and closing of the inlet valve 113 and the outlet valve 115, may control movement of the fluid(s) in and out of the plunger pump 100.

Figure 2:
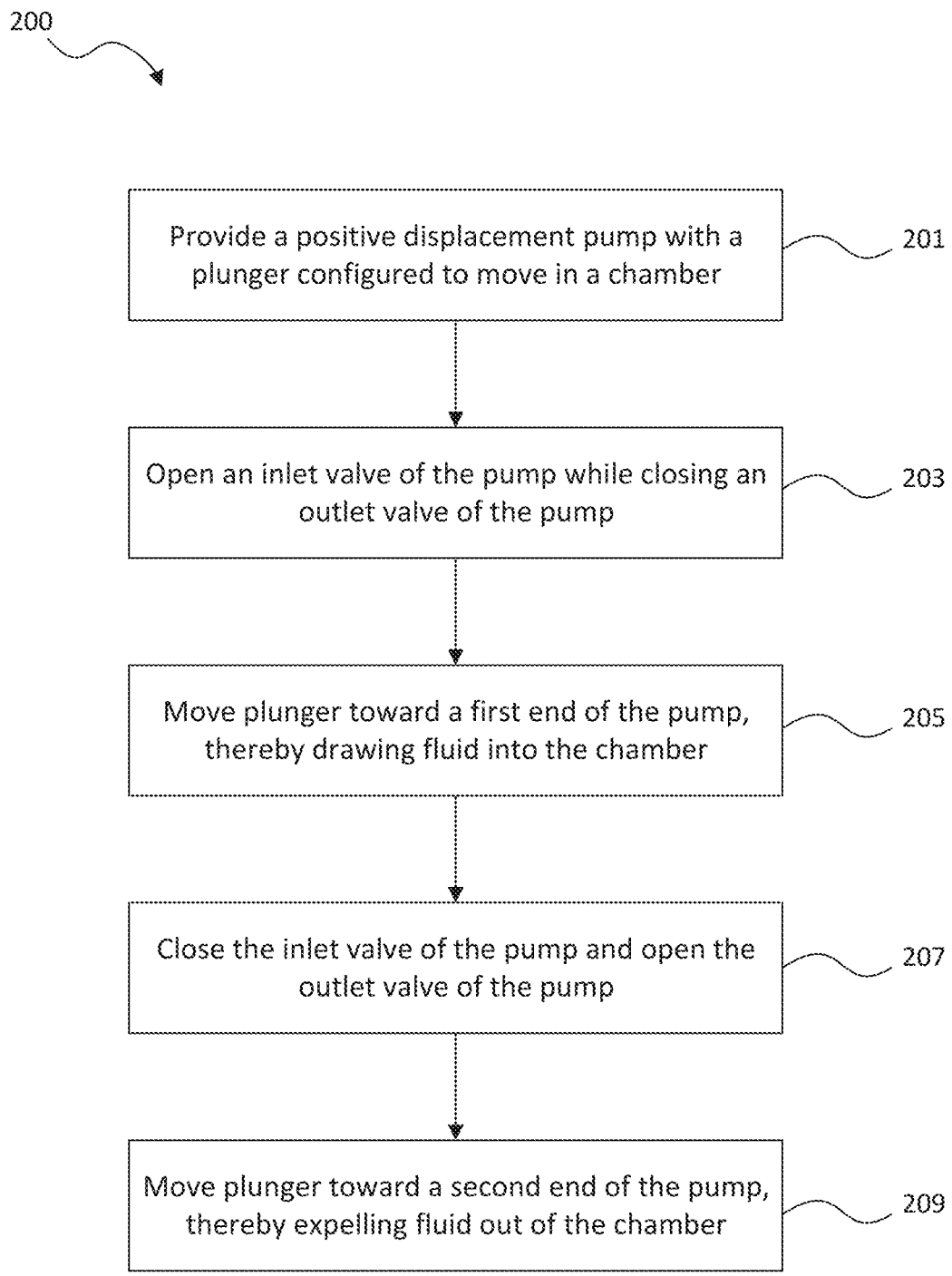
FIG. 2 illustrates a flowchart of a method for operating a pump, according to some embodiments of the disclosure.

FIG. 2 illustrates a flow chart 200 of an example method for operating the plunger pump 100 to control movement of the fluid(s) in and out of the plunger pump 100, according to some embodiments of the disclosure. A positive displacement pump, e.g., a plunger pump as shown in FIG. 1A, may be provided (step 201). The plunger pump may include at least a plunger 101 configured to move in and out of an interior chamber 109. For example, the plunger pump 100 may be configured with the plunger 101 located at a bottom, e.g., distal, end of the interior chamber 109, as shown in FIG. 1C. The inlet valve 113 may be opened while the outlet valve 115 may be closed (step 203). During a return stroke, the plunger 101 may move, e.g., using the connecting rod 120, from the bottom end to the top (e.g., first) end of the chamber 109 (step 205). This movement of the plunger 101 from the bottom end to the top end of the interior chamber 109 may create a vacuum in the interior chamber 109. If the inlet valve 113 is open and the outlet valve 115 is closed during the return stroke, fluid(s) from the fluid source may be drawn into the interior chamber 109 due to the negative pressure of the vacuum.

After the return stroke, the bottom of the plunger 101 may be located at the top (e.g., proximate) end of the interior chamber 109, as shown in FIG. 1B. The inlet valve 113 may be closed while the outlet valve 115 may be opened (step 207). During a forward stroke, the plunger 101 may move, e.g., using the connecting rod 120, from the top end to the bottom end of the interior chamber 109 (step 209). Before beginning the forward stroke, the bottom of the plunger 101 may be located at the top (e.g., proximate) end of the interior chamber 109, as shown in FIG. 1B. After the forward stroke, the bottom of the plunger 101 may be located at the bottom of the interior chamber 109, as shown in FIG. 1C. This movement of the plunger 101 from the top end to the bottom end of the interior chamber 109 may create a pushing force. If the outlet valve 115 is open and the inlet valve 113 is closed (step 207) during the forward stroke, the fluid(s) in the interior chamber 109 may be expelled through the outlet valve 115 to a receiving component.

The combination of the return stroke followed by the forward stroke may cause the plunger pump 100 to pump a fluid from the fluid source (not shown) to, e.g., a sprayer (not shown). In some embodiments, the plunger pump 100 may perform multiple iterations of the combined strokes to operate the machine (e.g., a hydraulic paint spray) that the plunger pump is installed in.

Figures 3A, 3B, 3C:
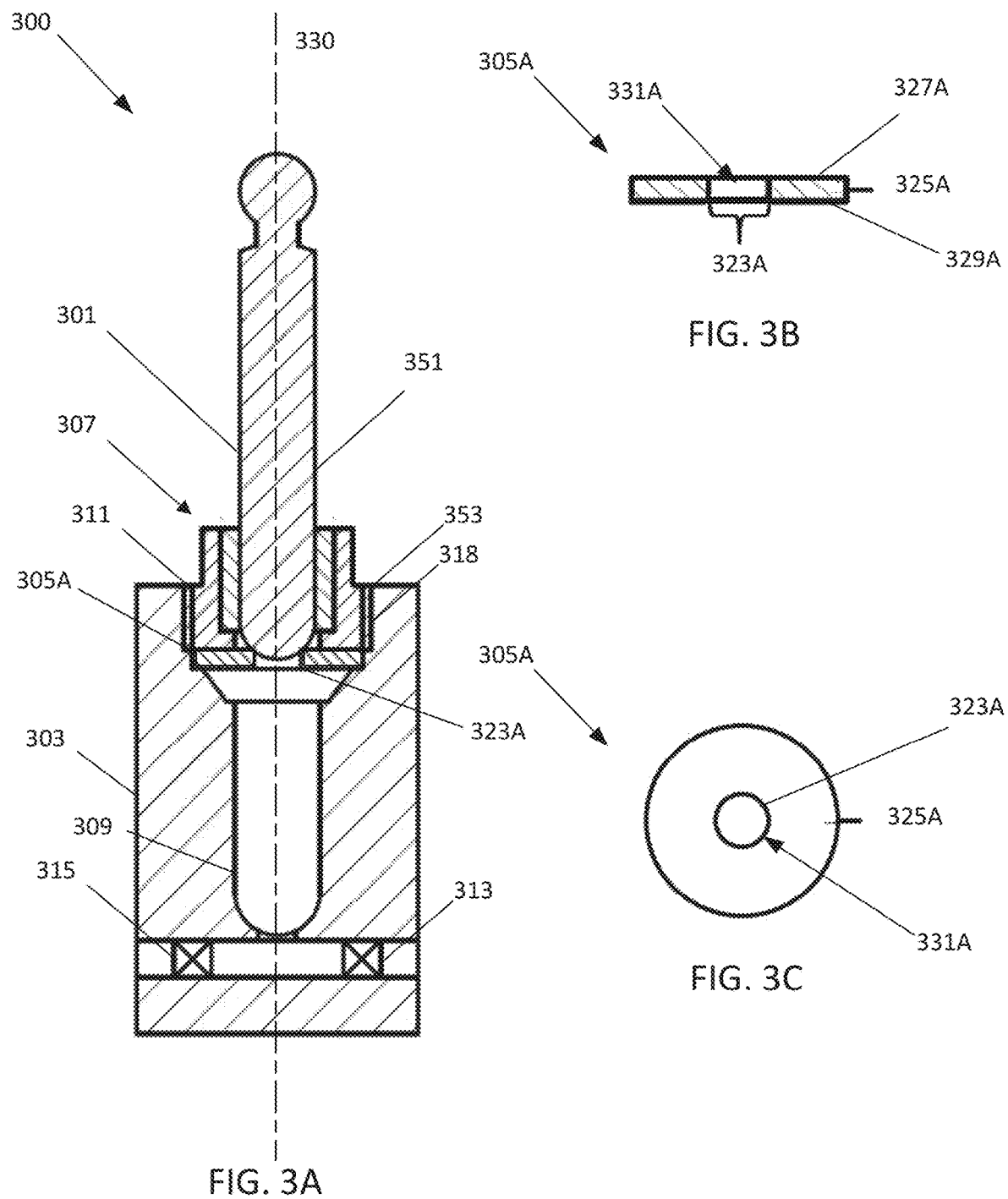

FIG. 3A illustrates a cross-sectional view of an example assembled plunger pump 300 prior to operation, according to some embodiments of the disclosure. FIGS. 3B-3C show side and top views, respectively, of an undeformed seal 305A, according to some embodiments of the disclosure. FIG. 3D illustrates a cross-sectional view of the same assembled plunger pump 300 during operation, according to some embodiments of the disclosure. FIGS. 3E-3F show side and top views, respectively, of a deformed seal 305D, according to some embodiments of the disclosure. In some embodiments, the deformed seal 305D can conform to the specific geometry of the pump, e.g., the plunger or casing of a pump. The deformed seal 305D may be a single component that can form a seal without a compressive force continuously being applied. Following installation of the seal, maintenance and/or adjustment of the seal may not be required. Moreover, because the deformed seal 305D may be formed based on the geometry of the plunger 301, the plunger 301 may be less likely to undergo wear from movement against the deformed seal 305, and the seal may be less likely to undergo wear from the plunger.

Prior to operation, the seal is in an undeformed state corresponding to a state where the seal 305 is not forming a seal. When the seal is in a deformed state, the deformed seal forms a seal between at least one surface of the seal and a surface of the pump (i.e., a sealing surface). The assembled plunger pump 300 may include at least a casing 303, a plunger 301, and an undeformed seal 305A located at the mouth 311 of the casing 303. Similarly, as described with respect to FIG. 1A, the assembled plunger pump 300 may also include an interior chamber 309, an inlet valve 313, an outlet valve 315, and a cap 307. The plunger 301, casing 303, interior chamber 309, mouth 311, threaded connection 318, inlet valve 313, and outlet valve 315 may have one or more functionalities and/or characteristics that are correspondingly similar to the plunger 101, casing 103, interior chamber 109, mouth 111, threaded connection 118, inlet valve 113, and outlet valve 115 of the plunger pump 100, as described above.

FIGS. 3B-3C illustrate side and top views, respectively, of an example undeformed seal 305A, according to some embodiments of the disclosure. The undeformed seal 305A may be a planar annular seal and may include a top surface 327A and a bottom surface 329A. The undeformed seal 305A may include an inner wall 323A whose diameter is an inner diameter of the undeformed seal 305A. In some embodiments, the inner wall 323A may form an opening 331A. In some embodiments, the undeformed seal 305A may exclude material in the opening 331A.

The undeformed seal 305A may also include an outer wall 325A whose diameter is an outer diameter of the undeformed seal 305A. As shown in FIG. 3A, in some embodiments, the inner diameter 323A of the undeformed seal 305A may be less than the diameter 351 of the plunger 301. In some embodiments, the outer diameter 325A of the undeformed seal 305A may be equal to the diameter 353 of the mouth 311 of the casing 303. For example, if the plunger 301 has an outer diameter of 0.5 in., the inner diameter of the undeformed seal 305A may be 0.25 in., the outer diameter of the undeformed seal 305A may be 1.25 in., and the thickness of the undeformed seal 305A may be 0.125 in. In some embodiments, the ratio of the undeformed hole of the seal and the diameter of the plunger may be two to one. In some embodiments, the ratio of the diameter of the plunger to the thickness of the seal may be four to one.

The undeformed seal 305A may have different dimensions, which in some embodiments, may depend on the dimensions of the plunger 301 and the mouth 311 of the casing 303. The undeformed seal 305A may be formed, for example, by punching the seal 305 from a sheet of material with a die machine, for example. A person of ordinary skill in the art would understand that other manufacturing methods may be used to form the seal, such as machining, injected molding, or 3D-printing. In some embodiments, the undeformed seal 305A may be formed from ultra-high molecular weight polyethylene (UHMWPE), for example. One skilled in the art would understand that other materials may be used to form the seal, such as acetal, ethylene tetrafluoroethylene (ETFE), ethylene chlorotrifluoroethylene (ECTFE), polychiorotrifluoroethylene (PCTFE), polytetrefluoroethylene (PTFE), and other plastics suitable for seals.

FIG. 3D illustrates a cross-sectional view of an example deformed seal 305D that results from deformation of the undeformed seal 305A. The deformed seal 305D may correspond to the seal 105 shown in FIGS. 1A-1C. The deformed seal 305D may include a top surface 327D, a bottom surface 329D, an inner wall 323D, and an outer wall 325D, that correspond to the top surface top surface 327A, bottom surface 329A, inner wall 323A, and outer wall 325A of undeformed seal 305A, respectively. The undeformed seal 305A may be deformed by pushing a plunger 301 through the opening 331A of undeformed seal 305A along longitudinal axis 330. Because the outer diameter of the plunger 301 is larger than the diameter of the opening 331A, the undeformed seal 305A, e.g., FIG. 3B, may be stretched to a deformed shape of, e.g., deformed seal 305D. For example, the plunger 301 may contact the top surface 327A of the undeformed seal 305A before entering the opening 331A. The downward force of the plunger 301 against the region of the top portion, located proximate to the inner wall 323A of the top surface 327A, as the plunger passes through the opening 331A may cause the seal 305A to deform. This downward force may also create a sealing surface between the plunger and a portion of the deformed top surface 327D.

As seen in FIG. 3D, the deformed seal 305D does not have the planar disc shape of undeformed seal 305A. Rather, in some embodiments, the deformed seal 305D may appear to be extruded relative to the undeformed seal 305A, as a result of the plunger passing through the opening 331A. For example, as seen in FIG. 3A, the undeformed seal 305A may be oriented in a plane corresponding to axis 342, which is oriented perpendicular to the longitudinal axis 330 of the pump system 300.

In contrast, as seen in FIG. 3F, an outer portion of the deformed seal 305D (e.g., the region proximate the outer wall 325D) may remain oriented perpendicular to the longitudinal axis 330 of the pump system 300. Meanwhile, an inner portion of the deformed seal 305D (e.g., the region proximate the inner wall 323D) may be extruded by the plunger 301 so that it may be oriented parallel or nearly parallel to the longitudinal axis 330. As a result, the deformed seal 305D may have a frustoconical-like shape, where the top and bottom surfaces 327D and 329D of the deformed seal 305D are no longer planar. In some embodiments, the deformed seal 305D may be reversible. For example, as shown in FIG. 3D, a base of the frustoconical-like shape is oriented downward, e.g., with the wider base away from the chamber of the pump assembly. In some embodiments, the deformed seal may form a seal when oriented such that the base of the frustoconical-like shape is oriented downward, e.g., with the wider base facing the chamber of the pump assembly.

The extruded portion of the deformed seal 305D may form a lip 337. As shown in FIG. 3D, the lip 337 may include the inner wall 323D. In some embodiments, the deformed inner wall 323D may be angled relative to an axis 342 that is perpendicular to the longitudinal axis, as a result of the forming the undeformed seal 305A into the deformed seal 305D. In some embodiments, the deformed outer wall 325D may be angled relative to the longitudinal axis 330 as a result of the stretching of the undeformed seal 305A into the deformed seal 305D.

The lip 337 may conform to the outer diameter of the plunger 301, e.g., the plunger used to stretch deformed seal 305D. Thus, the deformed seal 305D may provide a lip 337 that includes a sealing surface to provide a seal against a shaft of the plunger 301. Because the lip 337 of the deformed seal 305D can conform to an outer diameter of the plunger 301, undeformed seals 305A with the same dimensions may be used with plungers of various sizes. Additionally, because the lip 337 of the deformed seal 305D can conform to an outer diameter of the plunger 301, the deformed seal 305D may be used to provide a seal to an irregularly shaped plunger, e.g., a plunger with wear on its shaft. As discussed above, packing-type seals are suitable for use with cylindrical unworn plunger shafts. Additionally, unlike packing seals that rely on a plurality of compressed packings to form a seal, deformed seal 305D may be a single component that can form a seal without a compressive force continuously being applied.

In some embodiments, the deformed seal 305D may be plastically deformed to form the lip 337. As a result of the plastic deformation, once the lip 337 is formed, the deformed seal 305D may not return to the planar shape of the undeformed seal 305A. As a result, the deformed seal 305D may provide a unique seal based on the geometry, e.g., wear and imperfections, of the pump. Additionally, embodiments of a deformed seal 305D with a lip 337 that has undergone plastic deformation may be characterized by a strength-hardened region corresponding to the lip 337, where the deformed seal 305D is strengthened due to the plastic deformation and dislocation of the original atomic structure of the material. The strength-hardened region of the lip 337 may be more resilient to wear during the reciprocating movement of the plunger 301 compared to, e.g., packing-type seals that are elastically deformable. Moreover, because the deformed seal 305D may be formed based on the geometry of the plunger 301, the plunger 301 may be less likely to undergo wear from movement against the deformed seal 305. Additionally, the seal may be less likely to undergo wear from the plunger.

Figure 4A:
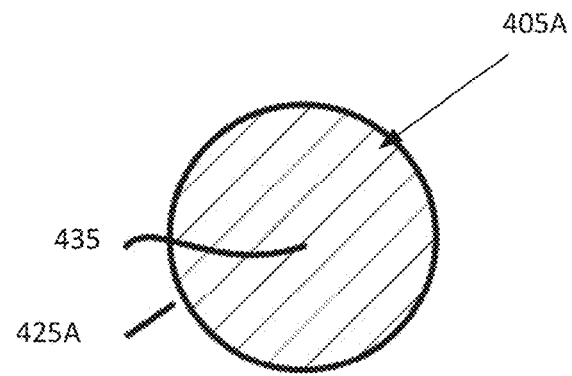
FIGS. 4A-4D illustrate a seal, according to some embodiments of the disclosure.
Figure 4B:
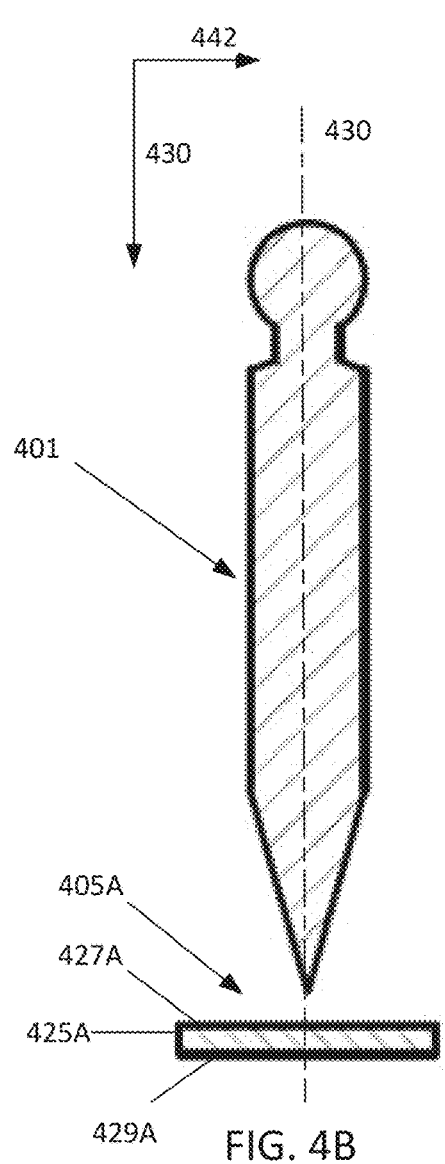
Figure 4C:
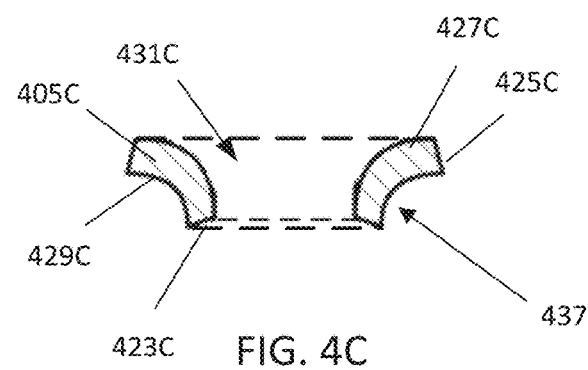
Figure 4D:
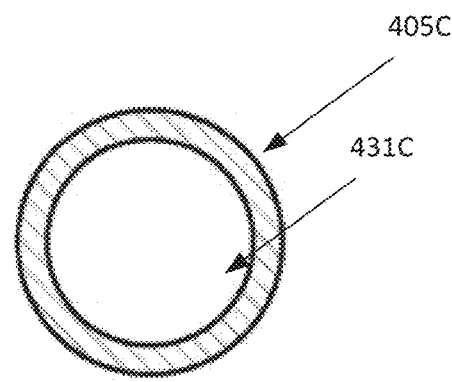

FIGS. 4A-4B illustrate an undeformed seal 405A, in accordance with embodiments of the disclosure. FIGS. 4C-4D illustrate side and top views, respectively, of a deformed seal 405C, according to some embodiments of the disclosure. In some embodiments, deformed seal 405C can conform to the specific geometry of the pump, e.g., the plunger or casing of a pump. The deformed seal 405C may be a single component that can form a seal without a compressive force continuously being applied. Following installation of the seal, maintenance and/or adjustment of the seal may not be required. Moreover, because the deformed seal 405C may be formed based on the geometry of the plunger 401, the plunger 401 may be less likely to undergo wear from movement against the deformed seal 405C. Additionally, the seal may be less likely to undergo wear from the plunger.

The undeformed seal 405A is a planar disc, but not annular, e.g., like the undeformed seal 305A of FIGS. 3A-3C. FIG. 4A shows a top view of undeformed seal 405A. FIG. 4B shows a side view of undeformed seal 405A and plunger 401. In some embodiments, e.g., as illustrated in FIG. 4A, an undeformed seal 405A may have a planar disc-like shape. The undeformed seal may have a top planar surface 427A and a bottom planar surface 429A. The undeformed seal 405A may include an outer wall 425A whose diameter is an outer diameter of the undeformed seal 405A. The undeformed seal 405A may be located in a plunger pump similar to the plunger pump 100, 300 described in FIGS. 1A and 3A, respectively.

FIGS. 4C-4D illustrate a deformed seal 405C according to some embodiments of the disclosure. The undeformed seal 405A may be deformed, e.g., by piercing the undeformed seal 405A with a pointed plunger 401. The pointed plunger 401 may be used to pierce the middle 435 of the undeformed seal 405A, thereby forming an opening 431C of a deformed seal 405C, as illustrated in FIGS. 4C-4D. The deformed seal 405C may be similar to the deformed seal 305D described with respect to FIGS. 3D-3F. For example, the deformed seal 405 may include a top surface 427C, a bottom surface 429C, and an outer wall 425C that correspond to the top surface 427A, bottom surface 429A, and outer wall 425A of undeformed seal 405A, respectively. Movement of the pointed plunger 401 through the undeformed seal 405A may pierce and stretch the undeformed seal 405A to a deformed shape. The deformed seal 405C may include an opening 431C and a lip 437, as described above with respect to lip 337 of FIG. 3D. The deformed seal 405C may be formed similarly to deformed seal 305D. For example, once the pointed plunger pierces the middle 435 of the undeformed seal 405A, the downward force of the pointed plunger 401 against the middle 435 of the top surface 427A as the plunger 401 passes through the opening 431C may create deformed seal 405C.

As seen in FIG. 4C, the deformed seal 405C does not have the planar disc shape of undeformed seal 405A (as in FIGS. 4A-4B). Rather, in some embodiments, the deformed seal 405C may appear to be extruded relative to the undeformed seal 405A, as a result of the plunger piercing and stretching the middle 435 of the undeformed seal 405A as the plunger moves through the seal. Similar to the deformed seal 305D (as in FIGS. 3D-3F), the deformed seal 405C may have a frustoconical-like shape, where the top and bottom surfaces 427C and 429C of the deformed seal 405C are not planar. In some embodiments, the deformed seal may be reversible, e.g., provide a seal while oriented upwards or downwards. Additionally, unlike packing seals that rely on a plurality of compressed packings to form a seal, seal 405C may be a single component that can form a seal without a compressive force continuously being applied.

The extruded portion of the deformed seal 405C may form a lip 437. The lip 437 may include a face 423C. In some embodiments, the face 423C may be angled relative to an axis 442 that is perpendicular to the longitudinal axis 430, as a result of the stretching of the undeformed seal 405A into the deformed seal 405C. In some embodiments, the deformed outer wall 425C may be angled relative to the longitudinal axis 430 as a result of the stretching of the undeformed seal 405A into the deformed seal 405C. In some embodiments, the face 423C may be parallel to the axis 442, and the outer wall 425C may be parallel to the longitudinal axis 430.

The lip 437 may conform to the outer diameter of the plunger 401, e.g., the plunger used to pierce and stretch deformed seal 405C. In some embodiments, the deformed seal 405C may be plastically deformed to form the lip 437. As a result of the plastic deformation, once the lip 437 is formed, the deformed seal 405C may not return to the planar shape of the undeformed seal 405A. Embodiments of a deformed seal 405C with a lip 437 that has undergone plastic deformation may be characterized by a strength-hardened region corresponding to the lip 437, where the deformed seal 405C is strengthened due to the plastic deformation and dislocation of the original atomic structure of the material. The strength-hardened region of the lip 437 may be more resilient to wear during the reciprocating movement of the plunger 401, than, e.g., packing-type seals that are elastically deformable.

In some embodiments, a pointed plunger 401 outside a pump system may be used to pierce and stretch undeformed seal 405A and form the deformed seal 405C. Once the deformed seal 405C is formed, the deformed seal 405C may be used in a plunger pump having a plunger with a rounded-nose, e.g., plunger 101 of FIGS. 1A-1C. In such embodiments, a shaft of the pointed plunger 401 may have the same maximum outer diameter as a shaft of the rounded-nosed plunger. In some embodiments, a shaft of the pointed plunger may have a maximum outer diameter less than a shaft of the rounded-nose plunger. In such embodiments, the deformed seal 405C may undergo further deformation when used with the rounded nose plunger in the pump system, e.g., as described with respect to FIGS. 3D-3F. In this manner, the seal 405C may be further stretched to conform to the specific geometry of the plunger of the pump system.

FIG. 5A illustrates an undeformed seal 505A in a plunger pump 500, in accordance with some embodiments disclosed herein. FIG. 5B illustrates a side view of the undeformed seal 505A. FIG. 5C illustrates a side view of a deformed seal 505C, according to some embodiments of the disclosure. In some embodiments, the deformed seal 505C can conform to the specific geometry of the pump, e.g., the plunger or casing of a pump. The deformed seal 505C may be a single component that can form a seal without a compressive force continuously being applied. Following installation of the seal, maintenance and/or adjustment of the seal may not be required. Moreover, because the deformed seal 505C may be formed based on the geometry of the plunger 501, the plunger 501 may be less likely to undergo wear from movement against the deformed seal 505C. Additionally, the seal may be less likely to undergo wear from the plunger 501.

The undeformed seal 505A may be used in a plunger pump similar to the plunger pump 100 described in FIG. 1A. The assembled plunger pump 500 may include at least a casing 503, a plunger 501, and an undeformed seal 505A located at the mouth 511 of the casing 503. Similarly, as described with respect to FIG. 1A, the assembled plunger pump 500 may include an interior chamber 509, an inlet valve 513, an outlet valve 515, and a cap 507. The plunger 501, casing 503, interior chamber 509, mouth 511, threaded connection 518, inlet valve 513, and outlet valve 515 may have one or more functionalities and/or characteristics that are correspondingly similar to the plunger 101, casing 103, interior chamber 109, mouth 111, threaded connection 118, inlet valve 113, and outlet valve 115 of the plunger pump 100, as described above.

FIG. 5B illustrates a cross-sectional view of an example undeformed seal 505A, according to some embodiments of the disclosure. The undeformed seal 505A may be an annular seal and may include a planar top surface 527A, a planar bottom surface 529A, an outer wall 525A, and an inner wall 523A. In some embodiments, the inner wall 523A may form an opening 531A. In some embodiments, the undeformed seal 505A may exclude material in the opening 531A. In some embodiments, the seal 505 may include an O-ring 547 disposed along the outer diameter of the seal 505.

The undeformed seal 505A may include at least three regions: (1) a top region 541 located adjacent to the top surface 527; (2) a bottom region 545 located adjacent to the bottom surface 529; and (3) a central region 543 located between the top and bottom regions. In some embodiments, the O-ring 547 may be located along the perimeter of seal 505A, near the central region 543. Each region of the undeformed seal 505A may have a different inner diameter, e.g., the inner wall 523A has a different inner diameter than another region of the undeformed seal 505A. For example, the top region 541A may have an inner diameter that corresponds to a diameter of a plunger (e.g., plunger 501 of FIG. 5A). The central region 543A may have an inner diameter larger than the top region 541A, bottom region 545A, or both. In some embodiments, the bottom region 545A may have a diameter that is less than an outer diameter of a plunger (e.g., plunger 501 of FIG. 5A).

The undeformed seal 505A is designed to provide a unitary seal body that includes a seal with a back-up ring. The sealing portion of the undeformed seal 505A may correspond to the bottom region 545A. The bottom region 545A that comprises the sealing portion of the undeformed seal 505A may be similar in shape to the undeformed seal 305A, e.g., FIG. 3B. For example, in some embodiments, the undeformed bottom region 545A may have an inner diameter that is smaller than the outer diameter of plunger 501.

In some embodiments, the top region 541A may act as a back-up ring. The back-up ring may ensure that the sealing portion maintains the proper position and shape when the seal is deformed and while the pump is in use. The central region 543A of the undeformed seal 505A may enable the bottom portion 545A to deform to a deformed sealing position. In some embodiments, the central region 543A may form gap between the top region 541A and the bottom region 545A.

The undeformed seal 505A may be deformed by pushing the plunger 501 along longitudinal axis 530 through the opening 531A of the undeformed seal 505A. As described above, the inner diameter of the top portion 541A may correspond to the outer diameter of the plunger 501, e.g., the plunger 501 may be able to slide through the top portion while making contact with the inner wall of the top portion 541A. In some embodiments, the top portion may not be deformed by the passage of the plunger 501. The plunger 501 may deform the bottom portion 545A, similar to plunger 301 deforming undeformed seal 305A, as described with respect to FIGS. 3A-3F. For example, the plunger 501 may contact a top surface 557A of the bottom portion 545A. Because the outer diameter of the plunger 501 may be larger than the inner diameter of the bottom portion 545A, the undeformed seal 505A may stretch to a deformed shape (e.g., deformed seal 505C). For example, the downward force of the plunger 501 against the top surface 557A of the bottom portion 545A, as the plunger passes through the opening 531A, may cause the seal 505A to deform.

As seen in FIG. 5C, the deformed seal 505C does not have the substantially flat shape of undeformed seal 505A. For example, in some embodiments, the top region 541C may remain substantially flat, while the bottom portion 545C, including top surface 557C and bottom surface 529A of the bottom portion 545C, of the deformed seal 505C may extrude relative to the bottom portion 545A of the undeformed seal 505A. For example, similar to the deformed seal 305D (e.g., FIGS. 3D-3F), the bottom portion 545C of the deformed seal 505C may have a frustoconical-like shape, where the bottom portion 545C of the deformed seal 505C is not flat.

The extruded bottom portion 545C of the deformed seal 505C may form a lip 537. The lip 537 may include a face 553C that corresponds to the inner wall 523A of the undeformed bottom portion 545A. In some embodiments, the face 553C may be angled relative to an axis 542 that is perpendicular to the longitudinal axis 530. In some embodiments, the outer wall 525C near the bottom portion 545C may be slightly flared, e.g., angled relative to the longitudinal axis 530 as a result of the stretching of the undeformed seal 505A into the deformed seal 505C. In some embodiments, the face 553C may be parallel to the axis 542, and the outer wall 525C near the bottom portion 545C may be parallel to the longitudinal axis 530.

The lip 537 may include a sealing surface that conforms to the outer diameter of the plunger 501, e.g., the plunger used to stretch the bottom portion 545C of deformed seal 505C. In some embodiments, the deformed seal 505C may be plastically deformed to form the lip 537. As a result of the plastic deformation, once the lip 537 is formed, the deformed seal 505C may not return to the flat shape of the bottom portion 545C of deformed seal 505C. Embodiments of a deformed seal 505C with a lip 537 that has undergone plastic deformation may be characterized by a strength-hardened region corresponding to the lip 537. The deformed seal 505C may be strengthened due to the plastic deformation and dislocation of the original atomic structure of the material. The strength-hardened region of the lip 537 may be more resilient to wear during the reciprocating movement of the plunger 501 (compared to, e.g., packing-type seals that are elastically deformable).

FIGS. 6A and 6B illustrate an example piston pump 600, according to some embodiments of the disclosure. For example, as described above, the piston pump may be similar to a plunger pump, but its sealing system may be attached to and move with the piston. FIG. 6A illustrates a side-view of the piston pump 600 prior to deforming an undeformed seal 605A. FIG. 6B illustrates a cross-section view of the piston pump 600 after deforming the seal to form deformed seal 605B. In some embodiments, deformed seal 605B can conform to the specific geometry of the pump, e.g., the casing of the pump. The deformed seal 605B may be a single component that can form a seal without a compressive force continuously being applied. Following installation of the seal, maintenance and/or adjustment of the seal may not be required. Moreover, because the deformed seal 605B may be formed based on the geometry of the casing 603, the casing 603 may be less likely to undergo wear from movement against the deformed seal 605B, and the seal may be less likely to undergo wear from the casing 603.

The piston pump 600 may include a casing 603, a piston 601, a seal 605A/605B, and a cap 607. In some embodiments, FIGS. 6A and 6B may illustrate the individual components of the piston pump 600 after being assembled. The piston pump may pump fluids as described in FIG. 2.

In some embodiments, the lower (e.g., distal) end of the piston 601 may include a cap 607. The cap 607 may be fastened to the lower end of the piston 601. The cap 607 may be configured to hold the seal 605A/605B in place when the cap 607 is fastened to the piston 601. In some embodiments, the cap 607 may move relative to the casing 603 during a stroke of the piston 601. The cap 607 may include one or more nuts, for example. In some embodiments, the cap 607 may include a threaded connection 618 such that it can be fastened to the distal end of the piston 601. In some embodiments, the threaded connection 618 may include a plurality of turns such that the longitudinal position of the cap 607 can be adjusted relative to the piston 601.

The casing 603 may be configured to house the components of the pump 600. The casing 603 may include an interior chamber 609 with a mouth 611 located at a top (e.g., proximate) end of the chamber 609. The interior chamber 609 may be configured to receive a shaft of the piston 601. In some embodiments, the properties (e.g., size, shape, etc.) of the interior chamber 609 may resemble the properties of the piston 601. In some embodiments, the diameter of the interior chamber 609 may correspond to an outer diameter of the cap 607. In some embodiments, vertical walls of the interior chamber 609 may be parallel.

The mouth 611 of the casing 603 may provide an opening for the piston 601 and cap 607 to move longitudinally in and out of the interior chamber 609 of the casing 603. In some embodiments, the diameter of the mouth 611 may be greater than the diameter of the shaft of the piston 601, the cap 607, or both. In some embodiments, the diameter of the interior chamber 609 may be greater than the diameter of the shaft of the piston 601, the cap 607, or both. In some embodiments, the undeformed seal 605A may have a diameter greater than the diameter of the mouth 611.

The sealing system of the piston pump 600 may include the seal 605A/605B. The seal 605A/605B may be positioned at a bottom end of the piston 601 and between the piston 601 and the cap 607. The seal 605A/605B may be positioned around an outer perimeter of the cap 607. In some embodiments, the seal 605A/605B may be capable of moving longitudinally along the interior chamber 609 during a stroke of the piston 601. In some embodiments, the seal 605 may not move relative to the piston 601 during a stroke. The properties of seal 605 are discussed in more detail below.

The undeformed seal 605A may be a planar annular seal and may include a top surface 627A and a bottom surface 629A. The undeformed seal 605A may include an inner wall (not shown) whose diameter is an inner diameter of the undeformed seal 605A. In some embodiments, the undeformed seal 605A may fit around an outer diameter of the cap 607. Because the cap 607 is threadably coupled to the bottom end of the piston 601, the undeformed seal 605A may also be coupled to the bottom end of the piston 601.

The undeformed seal 605A may also include an outer wall 625A whose diameter is an outer diameter of the undeformed seal 605A. As shown in FIG. 6A, in some embodiments, the outer diameter 625A of the undeformed seal 605A may be larger than a mouth 611 of the casing 603. For example, if the mouth 611 has diameter of 1.0 in., the cap 607 has an outer diameter of 0.5 in., the outer diameter of the undeformed seal 305A may be 1.25 in., the inner diameter of the undeformed seal may be 0.5 in., and the thickness of the undeformed seal 305A may be 0.125 in. In some embodiments, the thickness of the seal may be slightly larger than a gap between the piston 601 and the walls of the interior chamber 609. As described above, the undeformed seal 605A may have different dimensions, which in some embodiments, may depend on the dimensions of the piston 601, the cap 607, the interior chamber 609 of the casing 603, or a combination thereof.

The undeformed seal 605A may be formed, for example, by punching the seal 605 from a sheet of material with a die machine, for example. A person of ordinary skill in the art would understand that other manufacturing methods may be used to form the seal, such as machining, injected molding or 3D-printing. In some embodiments, the undeformed seal 605A may be formed from ultra-high molecular weight polyethylene (UHMWPE), for example. One skilled in the art would understand that other materials may be used to form the seal, such as acetal, ethylene tetrafluoroethylene (ETFE), ethylene chlorotrifluoroethylene (ECTFE), polychlorotrifluoroethylene, (PCTFE), polytetrefluoroethylene (PTFE) and other plastics suitable for seals.

FIG. 6B illustrates a cross-sectional view of a piston pump and includes an example deformed seal 605B that results from deformation of the undeformed seal 605A. The deformed seal 605B may correspond to the seal 105 shown in FIGS. 1A-1C. The deformed seal 605B may include a top surface 627B, a bottom surface 629B, an inner wall 623B, and an outer wall 625B that correspond to the top surface 627A, bottom surface 629A, inner wall (not shown), and outer wall 625A of undeformed seal 605A, respectively. The undeformed seal 605A may be deformed by pushing a piston 601 along longitudinal axis 630 through the mouth 611 and into the interior chamber 609 of the casing 603. Because the outer diameter of the undeformed seal 605A is larger than the mouth 611 and/or the diameter of the interior chamber 609, the undeformed seal 605A may be stretched to a deformed shape (e.g., deformed seal 605B). For example, the mouth 611 of the casing 603 may contact the bottom surface 629A of the undeformed seal 605A as it enters the interior chamber 609. The stationary casing may 603 provide an upward force on the undeformed seal 605A as the piston enters the interior chamber 609, which may cause the seal 605A to deform.

As seen in FIG. 6B, the deformed seal 605B does not have the planar disc shape of the undeformed seal 605A, where the undeformed seal 605A is oriented on an axis perpendicular to the longitudinal axis 630 of the pump. In some embodiments, the deformed seal 605B may appear to be extruded relative to the undeformed seal 605A. The extruded portion of the deformed seal 605B may form a lip 637. As shown in FIG. 6B, the lip 637 may include the outer wall 625B. In some embodiments, the deformed outer wall 625B may be perpendicular to the longitudinal axis 630. In some embodiments, the deformed outer wall 625B may be angled such that it is not perpendicular relative to the longitudinal axis 630, as a result of the stretching of the undeformed seal 605A into the deformed seal 605B. In some embodiments, the lip 637 may conform to the geometry of the bottom end of the piston 601. The lip 637 may conform to the diameter of the interior chamber 609. Thus, the deformed seal 605B may provide a seal between the piston 601 and the chamber 609. Because the lip 637 of the deformed seal 605B can conform to the diameter of the chamber 609, undeformed seals 605A with the same geometry may be used with piston pumps with interior chambers of various sizes. Moreover, because the deformed seal 605B was formed based on the geometry of the interior chamber 609 of the pump 600, the undeformed seal 605B may be less likely to experience wear from movement in the interior chamber. In some embodiments, the deformed seal 605B may be plastically deformed and include a strength-hardened region corresponding to the lip 637, as described above.

Figure 6C:
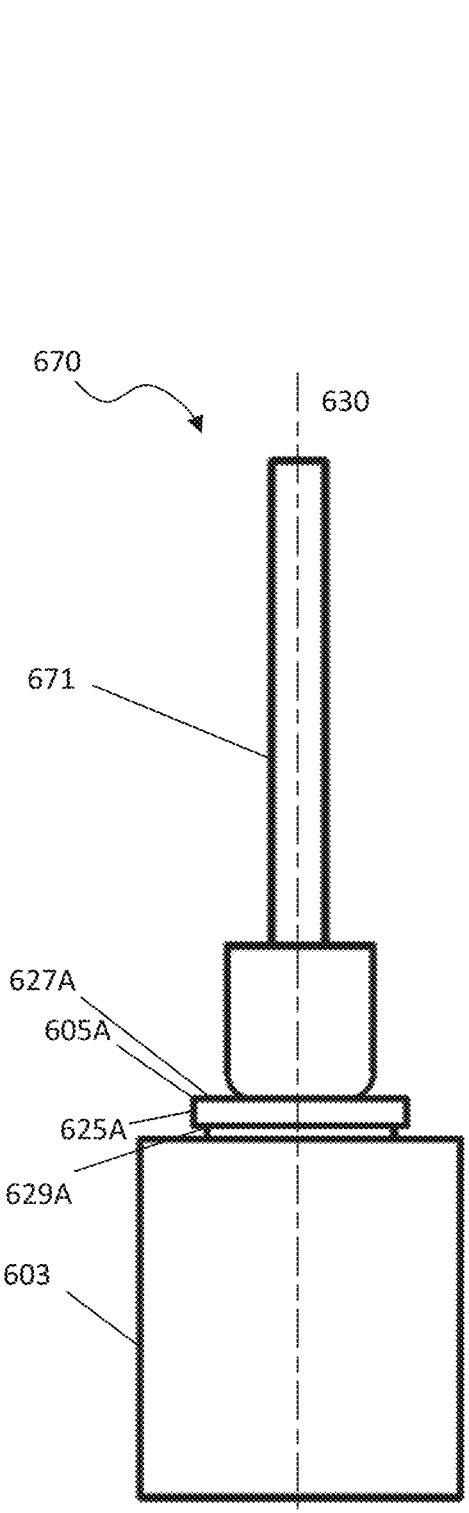
Figure 6D:
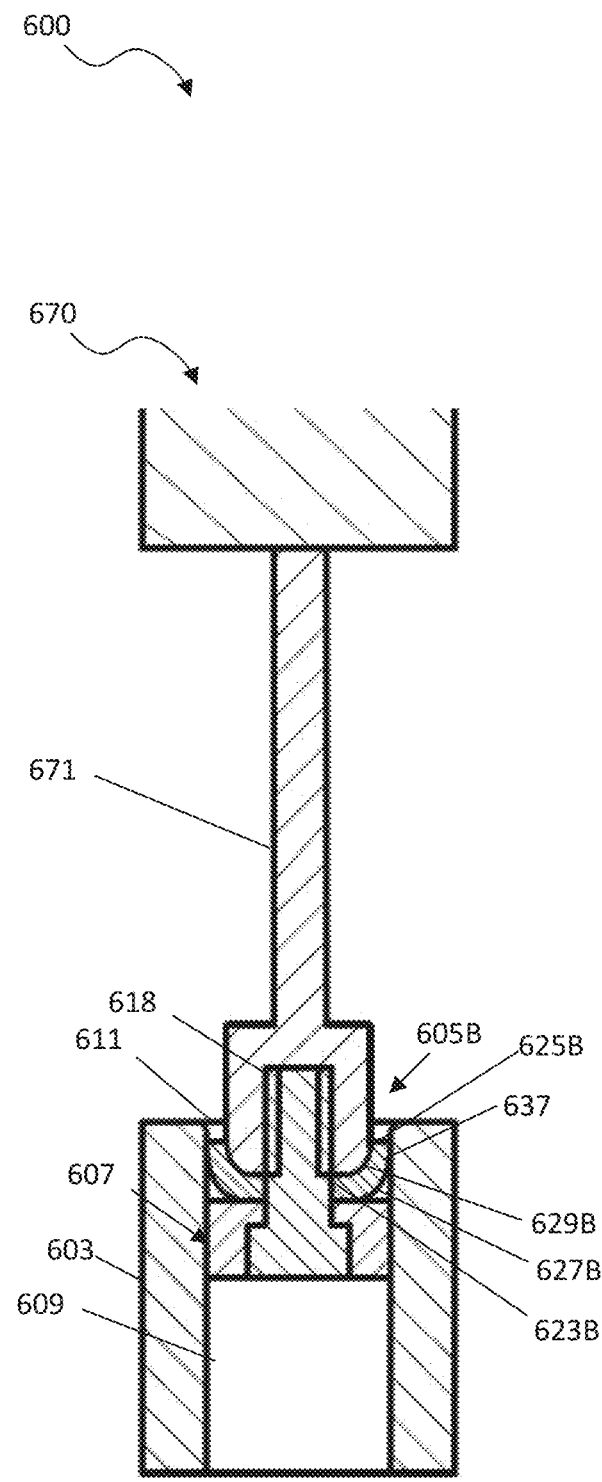

FIGS. 6C-6D illustrate an example piston pump 670 according to some embodiments of the disclosure. As shown in the figures, a shaft of the piston 671 may be narrower than a shaft of the piston 601. The piston pump 670 may be configured substantially similar to the piston pump 600 described with respect to FIGS. 6A-6B.

Figure 7:
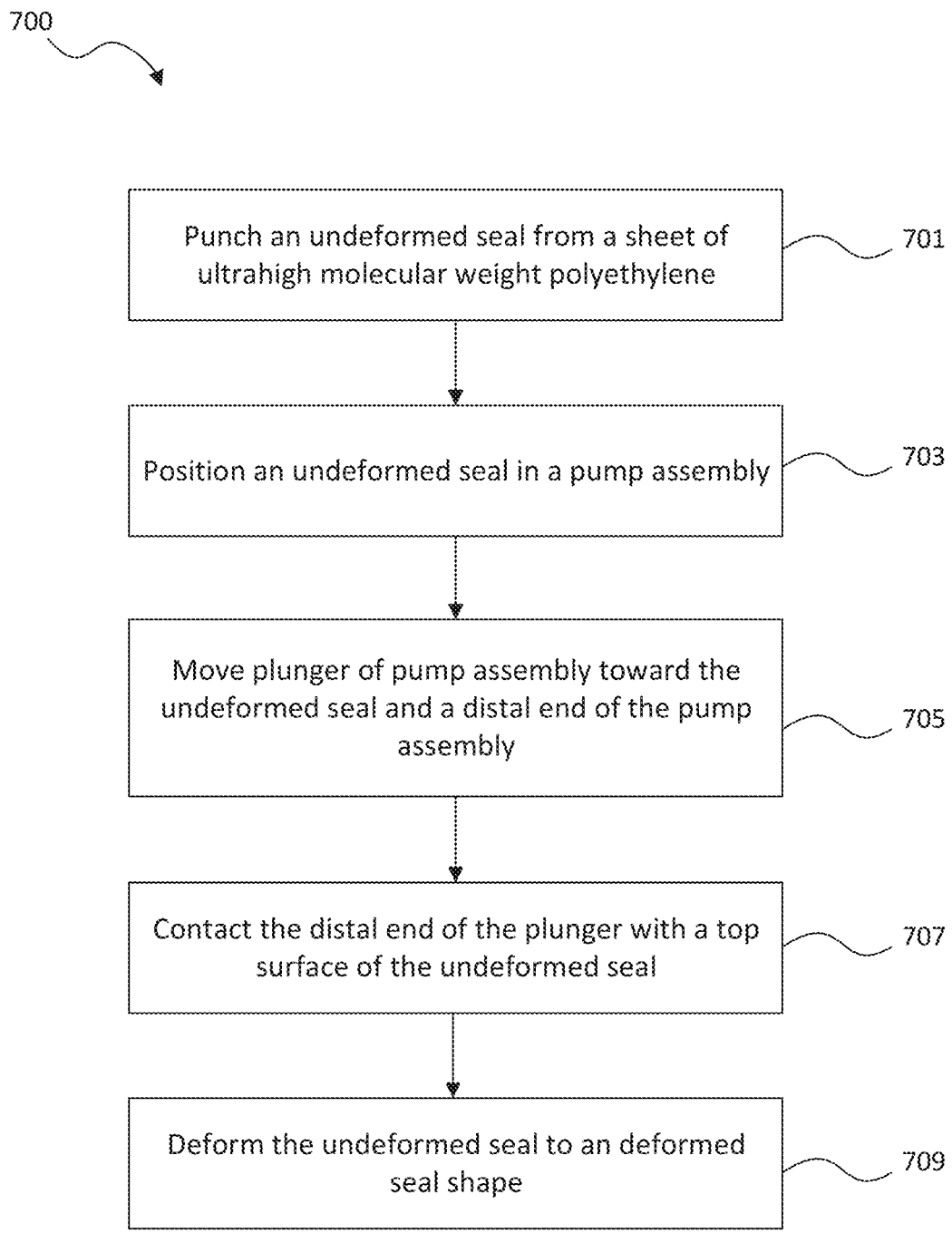
FIGS. 7-8 illustrate flowcharts of methods for making and using a seal, according to some embodiments of the disclosure.

FIG. 7 is a flow chart 700 of a method of making and using a seal in a pump, in accordance with some embodiments of the disclosure. An undeformed seal may be punched from a sheet of ultra-high molecular weight polyethylene (UHMWPE) (step 701). In some examples, the sheet of UHMWPE may be 0.125 in thick. In some examples, the sheet of UHMWPE may be in a range of 0.125-0.25 in. thick. The thickness of the sheet of UHMWPE may depend on the size, geometry, and pressure of the pump. The undeformed seal may be punched from the sheet of UHMWPE using, e.g., die-cutting, machining, or injection molding.

The undeformed seal may be provided for use in a pump (step 703). For example, the plunger pump may include at least a casing and a plunger configured to move along the longitudinal axis in and out of the casing. The plunger pump may further include a seal located in the casing such that the seal is positioned around an outer diameter of the plunger as the plunger moves longitudinally. The seal may be positioned in a mouth of the casing. In some examples, the undeformed seal may be secured in place using a cap.

The plunger pump may be placed in a hydraulic press, such that the hydraulic press can control the movement of the plunger. In some examples, the hydraulic press may be a pneumatic press. In some examples, the connecting rod may be driven by a hydraulic motor, pneumatic motor, or electric motor. In some examples, the hydraulic press may cause the plunger of the pump to move longitudinally toward the seal and a distal end of the chamber of the casing (step 705). The distal end of the plunger may come into contact with a top surface of the undeformed seal (step 707). The plunger may continue to move such that the plunger deforms the undeformed seal to form a deformed seal (step 709). In some examples, the seal may be deformed prior to assembling the pump. For example, a hydraulic press and/or heavy object such as a mallet may be used to deform the seal. In some examples, the seal may be deformed prior to placement in the plunger pump. In some examples, the deformed seal may conform to the specific dimensions of the plunger. In some examples, the plunger may extrude an inner portion of the undeformed seal to form the deformed seal. Once the seal is deformed to a sealing state, the plunger pump may be coupled to a connecting rod and operated to pump fluid in and out of the pump, as described with respect to FIG. 2.

Figure 8:
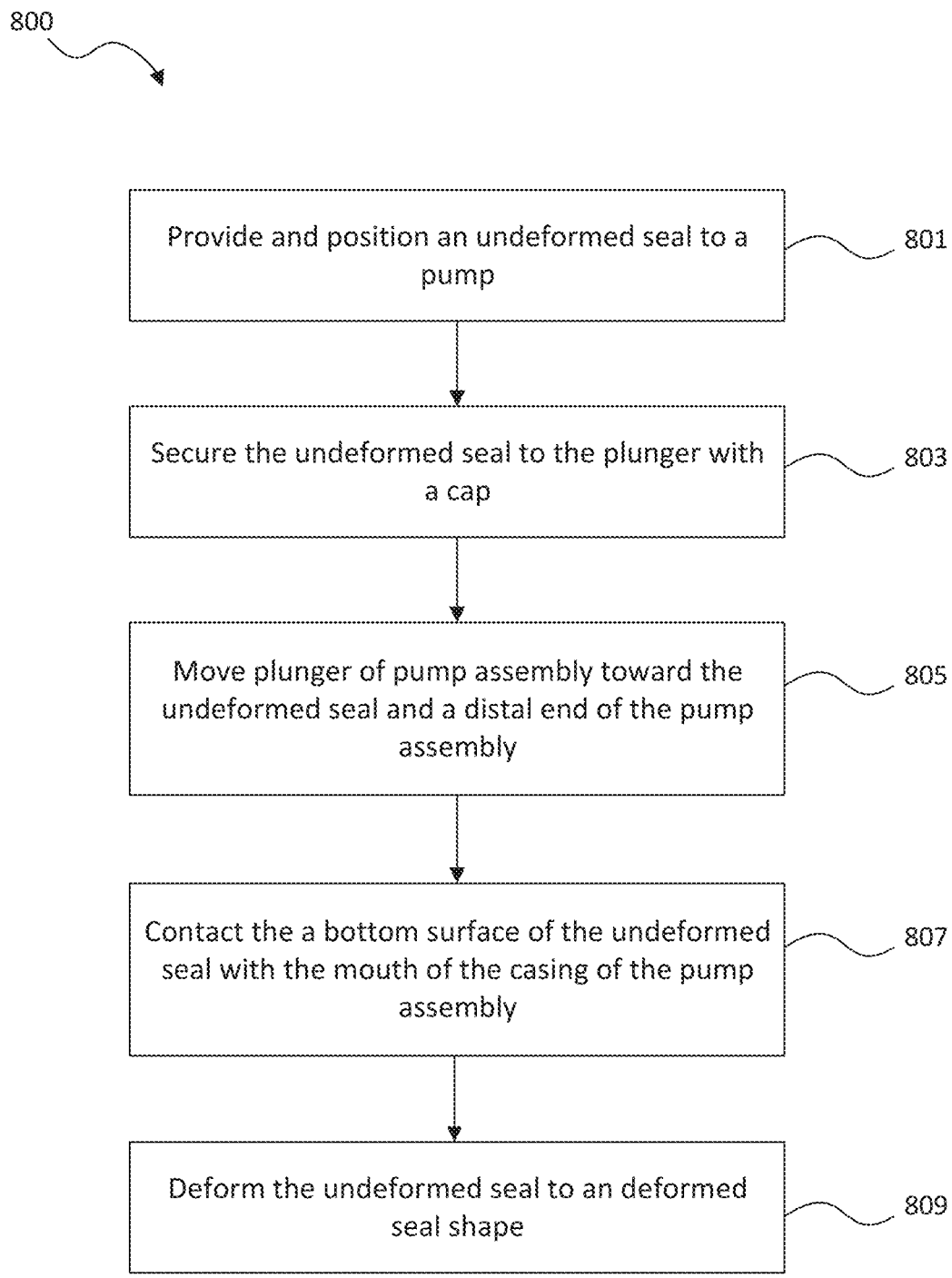

FIG. 8 is a flow chart 800 of a method of manufacturing and using a seal in a pump, in accordance with some embodiments of the disclosure. In some examples, the undeformed seal may be provided for use in a pump (step 801). For example, the undeformed seal may be positioned at a distal end of a plunger of the pump. In some examples, the undeformed seal may be secured in place using a cap (step 803). For example, the cap may be configured to pass through an opening in the seal and fasten to a female portion of the bottom end of the plunger. For example, the cap may be threadably coupled to the bottom end of the plunger such that the seal is sandwiched between the plunger and the cap. The plunger of the pump may move longitudinally. For example, a hydraulic press may move the plunger toward a bottom end of the chamber of the casing (step 805). The bottom surface of the undeformed seal may come in contact with the mouth of the casing (step 807). The mouth of the casing may exert a force against the undeformed seal as the plunger continues to move such that the seal is deformed to form a deformed seal (step 809). In some embodiments, a diameter of the interior chamber may exert the force against the undeformed seal to form the deformed seal. Once the seal is deformed, the plunger pump may be coupled to a connecting rod and operated to pump fluids in and out of the pump as described above.

Embodiments of the disclosure may include a sealing system including a housing comprising an interior chamber, a seal, and a plunger. The interior chamber may include a mouth. The seal may be located adjacent to the mouth of the interior chamber. The plunger may be configured to move through the seal and into the interior chamber along a longitudinal axis of the sealing system. The plunger may be further configured to deform the seal from a first position to a second position. In the first position, the seal may have a first shape, and in the second position, the seal may have a second shape, different from the first shape.

In some embodiments, the plunger may include a shaft, and the second shape may be deformed by the plunger such that the second shape may correspond to an outer diameter of the shaft of the plunger. In some embodiments, the first shape may be a flat disc oriented perpendicular to the longitudinal axis of the sealing system, where the first shape may include a first outer portion and a first inner portion. In some embodiments, the second shape may be frustoconical. In some embodiments, the second shape may include a second outer portion oriented perpendicular to the longitudinal axis of the sealing system and a second inner portion oriented parallel to the longitudinal axis of the sealing system. In some embodiments, the seal may be configured to provide a seal against the plunger in a first orientation, where a base of the frustoconical second shape may be oriented away from the interior chamber, and where the seal may be further configured to provide a seal against the plunger in a second orientation, where the second orientation may be opposite the first orientation, and where the base of the frustoconical shape may be oriented toward the interior chamber.

In some examples, the second shape may correspond to the seal being extruded by the plunger. For example, the second shape may extruded in a first direction along a longitudinal axis of the sealing system. In some examples, the second shape may be extruded in a second direction along a longitudinal axis of the sealing system, where the second direction is different from the first direction.

In some embodiments, the seal may be fastened to a bottom end of the plunger. In some embodiments, the seal comprises a back-up ring formed integrally with the seal. In some embodiments, the seal may be plastically deformed. In some embodiments, the seal may be made from ultra-high-molecular-weight polyethylene.

Embodiments of the disclosure may include a method that include providing a sealing system having a housing comprising an interior chamber, wherein the interior chamber includes a mouth, a seal disposed adjacent to the mouth of the interior chamber, and a plunger. The plunger may be moved toward a distal end of the interior chamber along a longitudinal axis of the sealing system. The plunger may make contact against a top surface of the seal. The plunger may then be used to deform the seal from a first shape to a second shape, where the first shape is different from the second shape.

In some embodiments, the second shape may conform to a shape of the plunger. In some embodiments, a hydraulic pump may move and be coupled to the plunger. In some embodiments, the seal may be punched from a plastic sheet of ultra-high molecular weight polyethylene. In some embodiments, the seal may be plastically deformed. In some embodiments, the seal may be deformed in a direction corresponding to a longitudinal movement of the plunger. In some embodiments, a fluid from a fluid source, may be pumped into the interior chamber and into a receiving component.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
   providing a sealing system comprising:
      a housing comprising an interior chamber, wherein the interior chamber includes a mouth,
      a seal disposed adjacent to the mouth of the interior chamber, and
      a pointed plunger comprising a shaft; and
   moving the plunger toward a distal end of the interior chamber along a longitudinal axis of the sealing system thereby piercing the seal with the plunger; and
   deforming, using the plunger, the seal from a first position to a second position,
   wherein in the first position, the seal is unbroken across a surface of the seal and has a planar disc shape oriented perpendicular to the longitudinal axis, and
   wherein in the second position, the seal has an opening in the surface formed by the piercing and a lip, wherein the lip conforms to a shaft diameter of the plunger.

2. The method of claim 1, further comprising moving a hydraulic pump coupled to the plunger.

3. The method of claim 1, wherein deforming the seal further comprises plastically deforming the seal.

4. The method of claim 1, wherein deforming the seal further comprises extruding the seal with the plunger in a first direction parallel to the longitudinal axis of the sealing system.

5. The method of claim 1, further comprising pumping a fluid from a fluid source, into the interior chamber and into a receiving component.

6. The method of claim 1, further comprising:
   fastening a cap to the mouth of the interior chamber, wherein the cap is configured to hold the seal in place when the cap is fastened to the mouth of the interior chamber.

7. The method of claim 1, further comprising:
   receiving fluid from a fluid source in the interior chamber via an inlet valve; and
   forcing fluid from the interior chamber into a receiving component via an outlet valve;
   wherein the inlet valve and the outlet valve are disposed in the housing near a distal end of the interior chamber,
   wherein moving the plunger into the interior chamber forces fluid from the interior chamber into the receiving component, and
   wherein moving the plunger out of the interior chamber forces fluid from the fluid source into the interior chamber.

8. A sealing system comprising:
a housing comprising an interior chamber, wherein the interior chamber includes a mouth;
a seal disposed adjacent to the mouth of the interior chamber; and
a pointed plunger configured to move through the seal and into the interior chamber along a longitudinal axis of the sealing system,
wherein in a first position, the seal is unbroken across a surface of the seal and has a planar disc shape oriented perpendicular to the longitudinal axis, and
wherein in a second position, the seal has an opening and a lip, wherein the lip conforms to a shaft diameter of the plunger;
wherein the plunger is further configured to pierce the seal to deform the seal from the first position to the second position to form the opening.

9. The sealing system of claim 8, wherein the plunger is further configured to stretch the seal to deform the seal from the first position to the second position.

10. The sealing system of claim 8, wherein deforming the seal from the first position to the second position comprises extruding the seal by the plunger.

11. The sealing system of claim 8, wherein deforming the seal from the first position to the second position comprises plastically deforming the seal.

12. The sealing system of claim 8, further comprising:
a hydraulic pump coupled to and configured to move the plunger.

13. The sealing system of claim 8, further comprising:
an inlet valve for receiving fluid from a fluid source in the interior chamber; and
an outlet valve for forcing fluid in the interior chamber into a receiving component;
wherein the inlet valve and the outlet valve are disposed in the housing near a distal end of the interior chamber, and
wherein movement of the plunger into the interior chamber forces fluid from the interior chamber into the receiving component, and
wherein movement of the plunger out of the interior chamber forces fluid from the fluid source into the interior chamber.

14. The sealing system of claim 8, further comprising:
a cap configured to be fastened to the mouth of the interior chamber, wherein the cap is configured to hold the seal in place when the cap is fastened to the mouth of the interior chamber.

15. The sealing system of claim 8, wherein the seal is made from ultra-high-molecular-weight polyethylene.

* * * * *